United States Patent
Uchida

(10) Patent No.: US 9,499,430 B2
(45) Date of Patent: Nov. 22, 2016

(54) SINTERING APPARATUS AND SINTERING METHOD FOR GLASS PREFORM FOR OPTICAL FIBER

(71) Applicant: SHIN-ETSU CHEMICAL CO., LTD., Tokyo (JP)

(72) Inventor: Kazuya Uchida, Tsukuba (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/617,154

(22) Filed: Feb. 9, 2015

(65) Prior Publication Data
US 2015/0274576 A1    Oct. 1, 2015

(30) Foreign Application Priority Data
Mar. 26, 2014   (JP) .................................. 2014-063460

(51) Int. Cl.
    *C03B 37/014*    (2006.01)
(52) U.S. Cl.
    CPC ............ *C03B 37/0146* (2013.01); *Y02P 40/57* (2015.11)
(58) Field of Classification Search
    CPC ................................................... C03B 37/014
    USPC ........................................................ 65/427
    See application file for complete search history.

(56) References Cited

U.S. PATENT DOCUMENTS

| | | | |
|---|---|---|---|
| 6,543,257 B1 * | 4/2003 | Koaizawa | C03B 37/01486 65/489 |
| 2014/0345332 A1 * | 11/2014 | Otosaka | C03B 37/0146 65/427 |

FOREIGN PATENT DOCUMENTS

| | | | |
|---|---|---|---|
| JP | 2008-105904 | * | 5/2008 |
| JP | 2008-179517 | * | 8/2008 |

OTHER PUBLICATIONS

JP 2008-105904, machine translation, Aug. 2008.*
JP 2008-179517, machine translation, Aug. 2008.*

* cited by examiner

*Primary Examiner* — Mark Halpern
(74) *Attorney, Agent, or Firm* — Oliff PLC

(57) ABSTRACT

A sintering apparatus heat-treats a porous glass preform for an optical fiber at a high temperature. The sintering apparatus includes: a glass preform elevating/lowering mechanism; a furnace core tube having an upper part having an opening part into which the glass preform is inserted by the elevating/lowering mechanism, and made of quartz glass; a heating furnace disposed on an outer circumference of the furnace core tube; an upper lid for closing the opening part of the furnace core tube; and a sealing member holding mechanism included in the upper lid and configured to hold a sealing member interposed between the opening part and the upper lid.

12 Claims, 5 Drawing Sheets

SINTERING APPARATUS AND SINTERING METHOD FOR GLASS PREFORM FOR OPTICAL FIBER

CROSS-REFERENCE TO RELATED APPLICATION

This non-provisional application claims priority under 35 U.S.C. §119(a) from Japanese Patent Application No. 2014-063460 filed on Mar. 26, 2014, the entire contents of which are incorporated herein by reference.

BACKGROUND

Technical Field

The present invention relates to sintering of a glass preform for an optical fiber. The present invention relates to a sintering apparatus and a sintering method for a porous glass preform for an optical fiber which prevent leakage of gas included in a furnace core tube into a chamber, and intrusion of an atmosphere into the furnace core tube.

Related Art

Methods referred to as a VAD method and an OVD method exist as a method for manufacturing a glass preform for an optical fiber. In these methods, first, glass raw materials are burned in a flame to produce glass fine particles. The glass fine particles are made to adhere to a target rod to be rotated, in an axis direction or a diameter direction, to manufacture a porous glass preform. The porous glass preform thus manufactured is heated to 1400 to 1600° C. in an apparatus referred to as a sintering furnace, to produce a transparent glass preform. In advance of vitrifying the porous glass preform into transparent glass, a dehydrating treatment may be performed at 1000 to 1250° C.

The porous glass preform is heated in a container referred to as a furnace core tube and made of quartz glass. A heating furnace is disposed around a central part of the furnace core tube to form a heating zone. An opening part for inserting the porous glass preform into the furnace core tube and an upper lid for closing the opening part are placed on an upper end part of the furnace core tube. A shaft suspending the porous glass preform penetrates the upper lid. In order to seal a space between the furnace core tube and the upper lid, a sealing member is sandwiched between a flange of the opening part of the furnace core tube and the upper lid.

In a sintering process of heating the porous glass preform to vitrify the porous glass preform into transparent glass, the process is performed in an atmosphere mainly containing helium. To the atmosphere, dehydrating gas such as chlorine reducing an OH group in glass, or oxygen for reducing binding defect in the glass is added if needed. The atmosphere is heated to 1400 to 1600° C. during the sintering process. The reason why helium is used is that it has high heat conductivity and high solubility in the glass, and air bubbles are less likely remain in the glass.

The porous glass preform passes through the heating zone while being rotated and elevated/lowered, and thereby the porous glass preform is sequentially heat-treated from the end part to produce a preform for an optical fiber.

The heat-treated preform for an optical fiber is removed from the upper opening part of the furnace core tube by a glass preform elevating/lowering mechanism. However, when the preform for an optical fiber passes through the vicinity of the flange of the opening part, the furnace core tube and the flange of the furnace core tube are heated to 300° C. or more by the heat radiation of the preform for an optical fiber. At this time, since a sealing member such as an O ring inserted between the upper lid and the furnace core tube has a ring shape, the sealing member cannot be retracted from the opening part of the furnace core tube, and is in a state where the sealing member is still placed on the flange. Therefore, the sealing member is also exposed to a high temperature when the preform is removed.

A metal gasket is generally used for the sealing member used for a high temperature place in many cases. However, when the dehydrating gas such as chlorine is made to flow in the furnace core tube, the metal gasket is possibly corroded, and the flange of the furnace core tube made of quartz glass is possibly damaged, which makes it difficult to repeatedly use the metal gasket. Then, a heat resistant resin such as Viton or PTFE is used for the sealing member. However, the heat resistant temperature is at most about 300° C. The sealing member is cured and shrink-deformed by repetition use involving high temperature exposure when the preform is removed, which causes a decrease in sealability.

On the other hand, the temperature of the heating furnace while the preform is heat-treated is increased to 1600° C. as described above. The furnace core tube made of quartz has a refractive index of about 1.5, and serves as a light waveguide for a heat ray (infrared ray or the like) generated by the heat radiation near the heating furnace. For this reason, the radiation heat of the heating furnace propagates toward the flange of the upper opening part during the heat treatment of the preform. With the enlargement of the preform, the required heating value of a heater is increased, and a heat treatment time by zone heating is also increased. Thereby, the vicinity of the flange of the upper opening part is always exposed to a high temperature during the heat treatment of the preform, and the resin sealing member is heat-deformed by repeating the prolonged heat treatment, which causes a decrease in airtightness.

It is an object of the present invention to provide a sintering apparatus and a sintering method for a glass preform for an optical fiber which can prevent deterioration of a sealing member sealing a flange part of a furnace core tube of the sintering apparatus, suction of external air, and leakage of sintering atmosphere gas to the exterior.

SUMMARY

The present invention solves the above-mentioned problems. The invention according to a first embodiment is a sintering apparatus for heat-treating a porous glass preform for an optical fiber at a high temperature to sinter the glass preform. The sintering apparatus includes: a glass preform elevating/lowering mechanism; a furnace core tube having an upper part having an opening part into which the glass preform is inserted by the elevating/lowering mechanism, and made of quartz glass; a heating furnace disposed on an outer circumference of the furnace core tube; an upper lid for closing the opening part of the furnace core tube; and a sealing member holding mechanism included in the upper lid and configured to hold a sealing member interposed between the opening part and the upper lid.

It is preferable that the sealing member holding mechanism is a groove formed in the upper lid; the groove is a dovetail groove; and the upper lid is made of transparent quartz glass. It is preferable that the sealing member is an O ring made of a resin; the sealing member has a white surface; and the sealing member is made of any one of silicone rubber, fluoride rubber, and polytetrafluoroethylene.

The invention according to a second embodiment is a sintering method for a porous glass preform for an optical fiber. The method includes: inserting a glass preform into a furnace core tube having an upper part having an opening part into which the glass preform is inserted, and made of quartz glass; closing the opening part by an upper lid and a sealing member interposed between the opening part and the upper lid; heat-treating the stored glass preform by a heating furnace disposed on an outer circumference of the furnace core tube; and removing the heated glass preform through the opening part in a state where the sealing member is held on the upper lid by a sealing member holding mechanism included in the upper lid.

The invention according to a third embodiment is a sintering apparatus for heat-treating a porous glass preform for an optical fiber at a high temperature to sinter the glass preform. The sintering apparatus includes: a glass preform elevating/lowering mechanism; a furnace core tube having an upper part having an opening part into which the glass preform is inserted by the elevating/lowering mechanism, and made of quartz glass; a heating furnace disposed on an outer circumference of the furnace core tube; an upper lid for closing the opening part of the furnace core tube; a flange provided in order to put the upper lid on the opening part; a sealing member sealing a space between the flange and the upper lid, and a heat radiation mechanism provided below the opening part of the furnace core tube.

The furnace core tube may have an outer surface to which a coating material absorbing light is applied as the heat radiation mechanism. The furnace core tube may have an opaque outer surface as the heat radiation mechanism. It is preferable that the flange is made of opaque quartz. The upper lid is equipped with an O ring. It is preferable that the sealing member has a white surface, and the sealing member is placed so as not to cross an upper extended surface of an inner wall of the furnace core tube.

Effect of the Invention

A sintering apparatus and a sealing method for a glass preform for an optical fiber of the present invention are used, and thereby the present invention exhibits the following excellent effects. Suction of external air into a furnace core tube and leakage of sintering atmosphere gas to the exterior can be prevented, and deterioration of the characteristic of the preform for an optical fiber can be suppressed.

DETAILED DESCRIPTION

Figure 1:
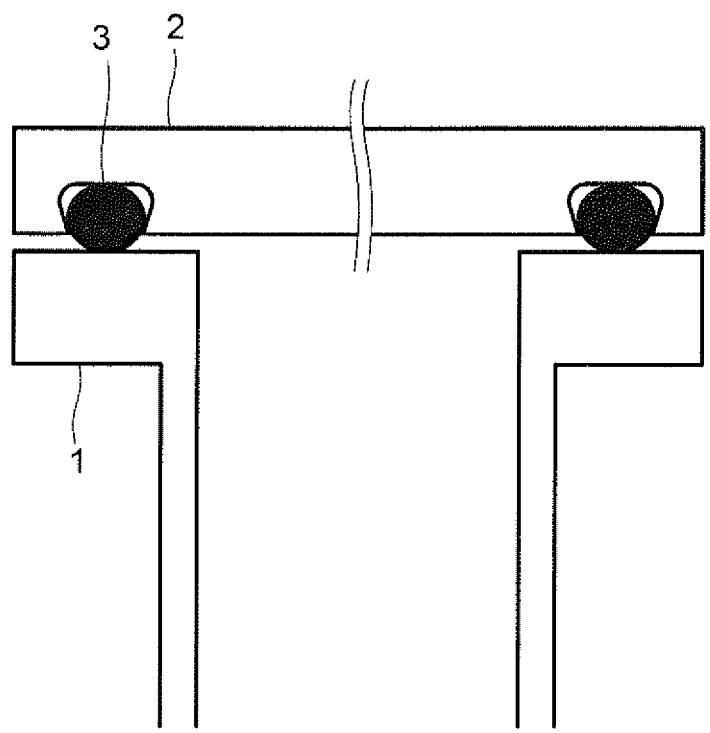
FIG. 1 is a schematic partial sectional view showing a sealed state between an opening part of a furnace core tube and an upper lid in a sintering apparatus of the present invention.

In a sintering apparatus of the present invention, in order to seal a space between an upper lid and an opening part of a furnace core tube, the upper lid is equipped with a sealing member holding mechanism holding a sealing member. Examples of the holding mechanism include a dovetail groove formed in the upper lid. Thus, the sealing member is attached to the upper lid side, and thereby when the upper lid is lifted to remove a preform for an optical fiber after the end of a sintering process, the preform for an optical fiber and the sealing member in a high temperature condition can be set apart from each other by a constant distance. The sealing member is not exposed to a high temperature, which can suppress the heat deterioration of the sealing member.

Radiation heat from a heating furnace heater propagates upward through the furnace core tube, reaches the sealing member, and heats the sealing member. The radiation heat transforms and deteriorates the sealing member. However, a flange of the furnace core tube is made of opaque quartz, and thereby the radiation heat is scattered on the flange part and radiated to the outside, which can suppress the transmutation and deterioration of the sealing member. The sealing member is made white, and thereby the reflectance ratio of the sealing member to a heat ray is increased, which can suppress the heat absorption of the sealing member. An O ring made of a resin is used as the sealing member. The sealing member is made of silicone rubber, fluoride rubber, and polytetrafluoroethylene or the like.

A heat radiation mechanism is provided below the opening part of the furnace core tube. The heat radiation mechanism attenuates the heat ray propagating upward through the furnace core tube, and reduces the heat ray reaching the upper flange part, which can suppress the increased temperature of the sealing member. A black coating material or the like is applied to an outer wall between the upper flange of the furnace core tube and a heating zone by a heating furnace as the heat radiation mechanism, and thereby the radiation heat is gradually absorbed by the coating while propagating through a quartz glass member of the furnace core tube. The radiation heat is radiated to the outside from the coating part. The radiation heat propagating upward can be reduced. Furthermore, the surface of the outer wall of the furnace core tube is made opaque by roughening, and thereby the radiation heat to the upper lid side can also be reduced.

The upper lid may be equipped with the O ring, and the sealing member may be placed so as not to cross an upper extended surface of an inner wall of the furnace core tube. Thereby, the radiation heat propagating upward through the furnace core tube passes through the transparent upper lid without directly irradiating the sealing member with the radiation heat, and is radiated upward from the upper lid.

Hereinafter, the present invention will be further described in detail with reference to Examples.

EXAMPLES

Example 1

FIG. 1 is a schematic view showing a sealed state between an opening part of a furnace core tube and an upper lid in the present invention. Reference sign 1 designates a flange of the upper opening part of the furnace core tube; Reference sign 2, the upper lid; and Reference sign 3, a sealing member. The sealing member 3 is stored in a groove formed in the upper lid 2.

The furnace core tube has an inner diameter of 380 mm and an outer diameter of 390 mm, and is made of transparent quartz glass. The flange 1 made of transparent quartz glass and having a thickness of 10 mm and a width of 25 mm is provided on the opening part. The upper lid 2 is made of transparent quartz glass, and has a diameter of 430 mm and a thickness of 15 mm. A shaft suspending a preform penetrates the center of the upper lid 2. The shaft is connected to a preform elevating/lowering apparatus.

A sealing member 3 is a black O ring made of fluoride rubber, and has an inner diameter of 400 mm and a wire diameter of 8 mm. The sealing member 3 is stored in a groove formed on a circumference having a diameter of 405 mm in the upper lid 2. The groove is a dovetail groove having a depth of 5 mm, an opening part of 6 mm, and a bottom of 10 mm, and holds the sealing member 3 on the upper lid 2. The sealing member 3 is brought into contact with a flat face of the flange 1, and thereby the furnace core tube can be sealed. The sealing member 3 is disposed outside an upper extended surface of an inner wall of the furnace core tube (inner diameter: 380 mm/outer diameter: 390 mm) so as not to cross the upper extended surface (inner diameter: 400 mm).

A porous glass preform having a body part diameter of 360 mm and a body part length of 2000 mm was sintered by using a sintering apparatus provided with the furnace core tube, the upper lid, and the sealing member.

Specifically, the porous glass preform suspended by the shaft was inserted from the upper opening part of the furnace core tube, and accommodated in the furnace core tube. The opening part was closed by the upper lid to seal the furnace core tube. The porous glass preform was subjected to a dehydrating treatment while the porous glass preform was made to pass through a heating zone at a rate of 5 mm/min with the temperature of a heating furnace set to 1200° C. in a state where the furnace core tube was filled with argon gas containing 15 vol % of chlorine. Subsequently, the porous glass preform was vitrified into transparent glass while the porous glass preform was made to pass through the heating zone at a rate of 3 mm/min with the temperature of the heating furnace set to 1550° C. using helium gas as atmosphere gas in the furnace core tube.

The temperature of the upper lid was kept at 130° C. or less during the heat treatment, and the temperature of the sealing member was also kept at 200° C. or less. After the treatment, a transparent glass preform was obtained, which had a body part diameter of 170 mm and a length of about 2000 mm. The glass preform was slowly cooled to about 1000° C. in the furnace core tube, and the upper lid was then opened to remove the glass preform from the upper opening part of the furnace core tube. The glass preform was removed by elevating the glass preform at a rate of 30 mm/sec by the preform elevating/lowering apparatus. The glass preform was made to pass through the vicinity of the opening part over about 1 minute. At this time, the surface temperature of the flange of the opening part was increased to 400° C. However, the temperatures of the upper lid and sealing member was still 130° C. or less and 200° C. or less, respectively, which caused no deformation of the sealing member.

Example 2

Figure 2:
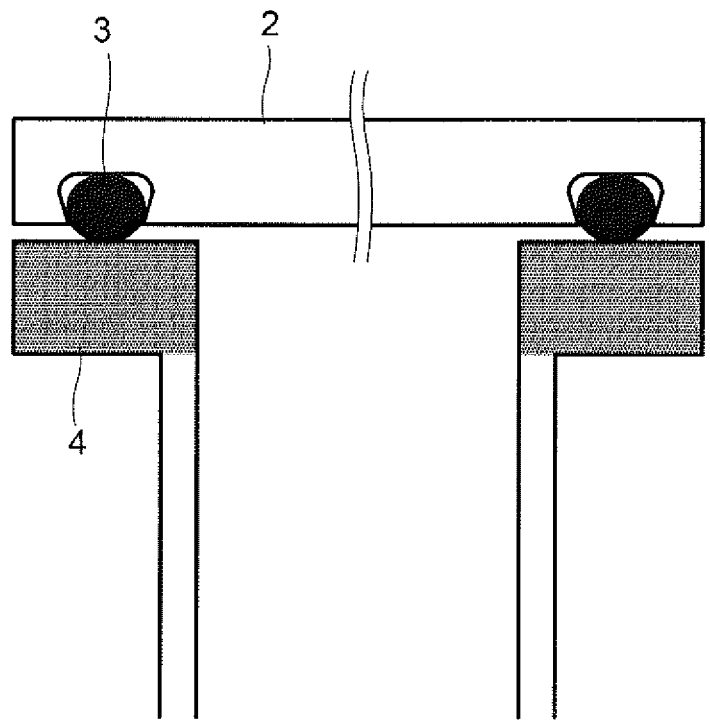
FIG. 2 is a schematic partial sectional view showing an example using opaque quartz for a flange of the furnace core tube.

A porous glass preform was sintered on the same condition as that of Example 1 by using a sintering apparatus of FIG. 2. The sintering apparatus shown in FIG. 2 was an example in which a flange part 4 of a furnace core tube was made of opaque quartz in the sintering apparatus of the present invention. A heat ray emitted from a heating furnace and propagating upward through the furnace core tube was scattered on the flange part and radiated to the outside, which could effectively reduce an increase in the temperatures of an upper lid and sealing member, and could keep the temperatures of the upper lid and sealing member at 110° C. or less.

Example 3

Figure 3:
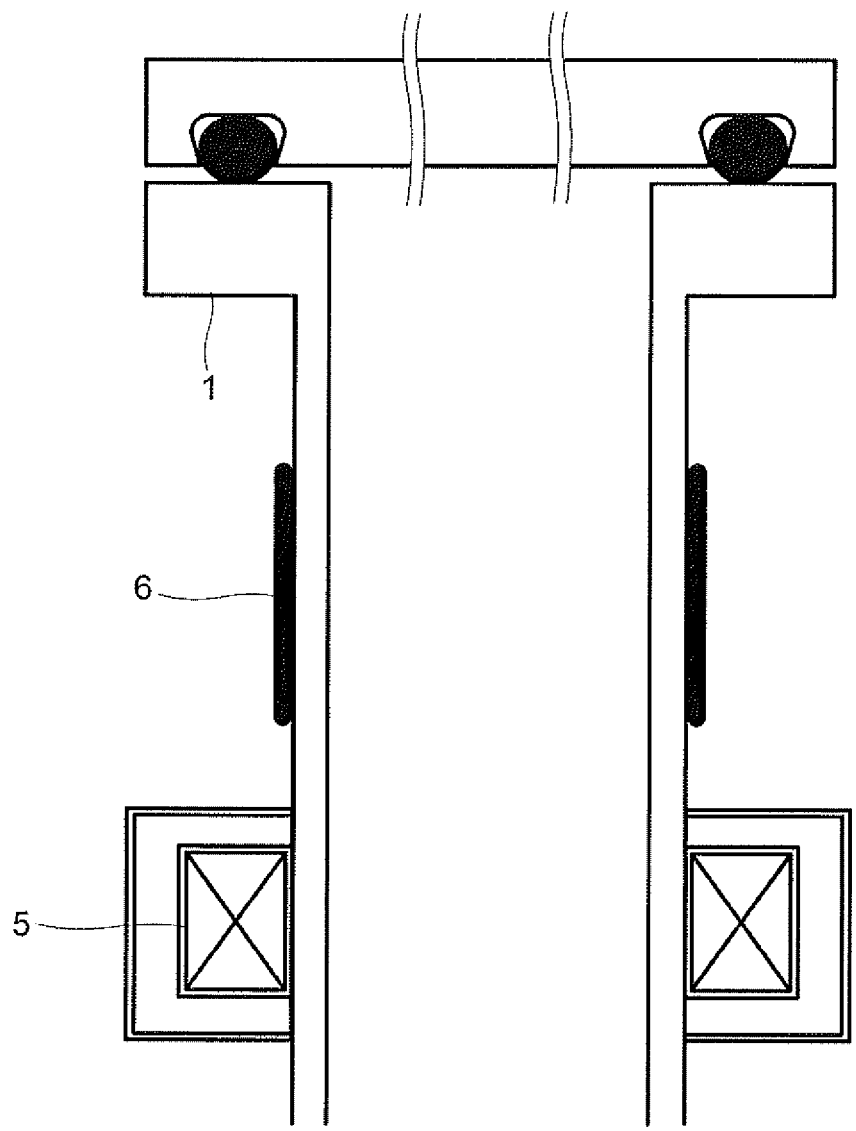
FIG. 3 is a schematic partial sectional view showing a sintering apparatus in which an outer circumferential part of the furnace core tube is coated in black.

A porous glass preform was sintered on the same condition as that of Example 1 by using a sintering apparatus of FIG. 3. The sintering apparatus shown in FIG. 3 was provided with a heat radiation mechanism provided below an opening part of a furnace core tube. An outer wall 6 between an upper flange of the furnace core tube and a heating zone by a heating furnace was coated in black as the heat radiation mechanism. A heat ray emitted from the heating furnace 5 and propagating upward through the furnace core tube was gradually absorbed by the coating while propagating through a quartz glass member of the furnace core tube, and the absorbed heat was radiated to the outside from the coating. Thus, the heat ray reaching the upper flange part could be reduced, and the temperatures of an upper lid and sealing member could be kept at 110° C. or less.

Example 4

Figure 4:
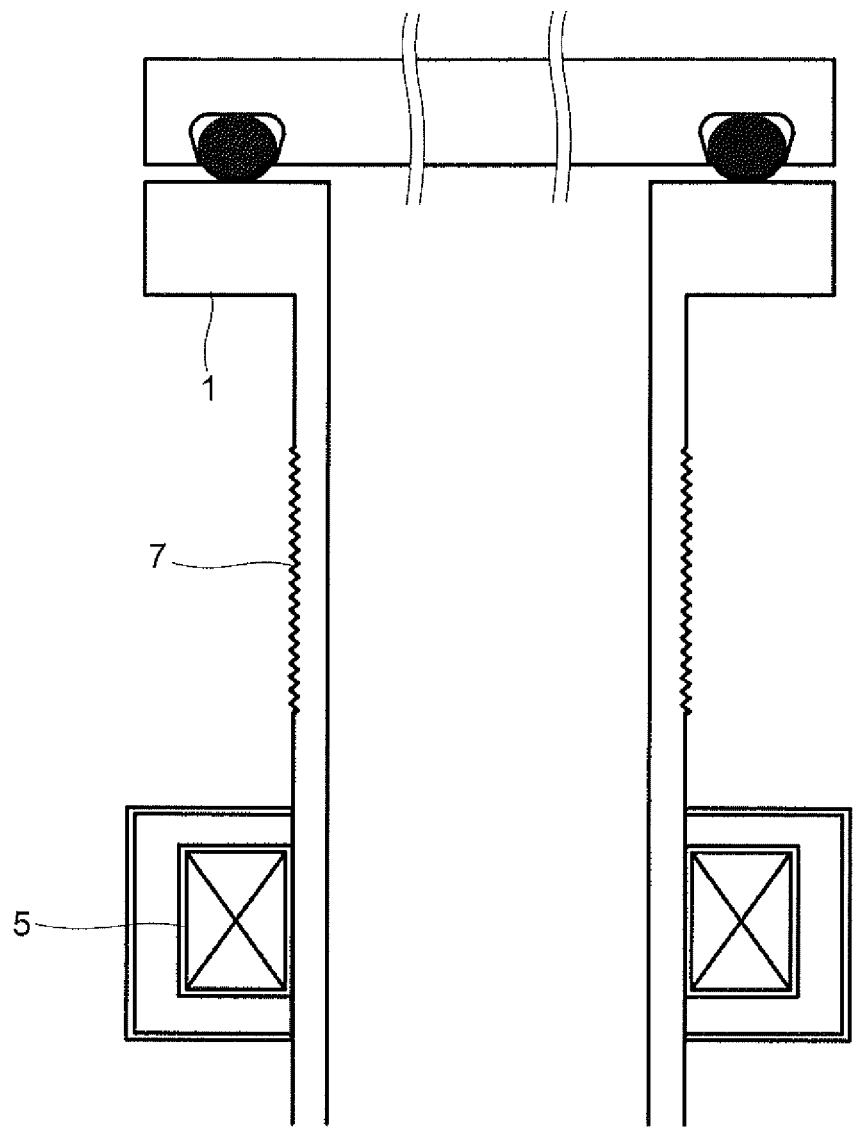
FIG. 4 is a schematic partial sectional view showing a sintering apparatus in which a surface of the outer circumferential part of the furnace core tube is made opaque by roughening.

A porous glass preform was sintered on the same condition as that of Example 1 by using a sintering apparatus of FIG. 4. The sintering apparatus shown in FIG. 4 was provided with a heat radiation mechanism provided below an opening part of a furnace core tube. An outer wall 7 between an upper flange of the furnace core tube and a heating zone by a heating furnace 5 was opacified as the heat radiation mechanism to make the outer wall be a frosted glass. A heat ray emitted from the heating furnace and propagating upward through the furnace core tube was gradually scattered on an opaque portion of the outer wall while propagating through a quartz glass member of the furnace core tube, and the heat ray was radiated to the outside from the opaque portion. Thus, the heat ray reaching the upper flange part could be reduced, and the temperatures of an upper lid and sealing member could be kept at 120° C. or less.

Example 5

Figure 5:
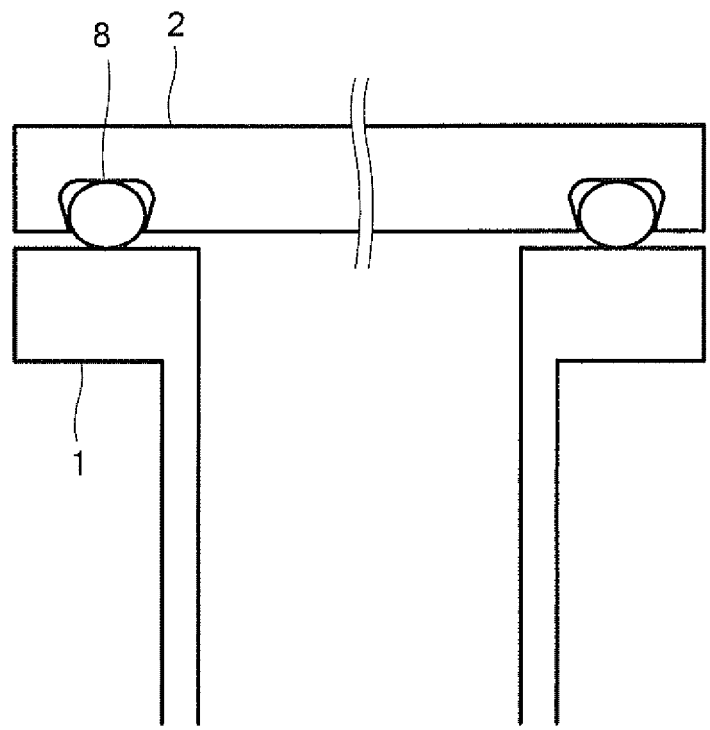
FIG. 5 is a schematic partial sectional view showing an example using a white sealing member.

A porous glass preform was sintered on the same condition as that of Example 1 by using a sintering apparatus of FIG. 5. In the sintering apparatus shown in FIG. 5, a sealing member 8 was made white, and thereby the reflectance ratio of the sealing member to a heat ray was increased, which could suppress heat absorption, and could keep the temperature of the sealing member at 150° C. or less.

What is claimed is:

1. A sintering apparatus for heat-treating a porous glass preform for an optical fiber at a high temperature to sinter the glass preform, the sintering apparatus comprising:
a glass preform elevating/lowering mechanism;
a furnace core tube having an upper part having an opening part into which the glass preform is inserted by the elevating/lowering mechanism, and made of quartz glass;
a heating furnace disposed on an outer circumference of the furnace core tube;
an upper lid for closing the opening part of the furnace core tube;

a flange provided in order to put the upper lid on the opening part;

a sealing member sealing a space between the flange and the upper lid; and a heat radiation mechanism provided below the opening part of the furnace core tube, wherein the heat radiation mechanism is adapted for attenuating heat rays propagating upward through the furnace core tube and reducing the heat rays reaching the flange.

2. The sintering apparatus according to claim 1, wherein the space is a groove formed in the upper lid.

3. The sintering apparatus according to claim 2, wherein the groove is a dovetail groove.

4. The sintering apparatus according to claim 1, wherein the upper lid is made of transparent quartz glass.

5. The sintering apparatus according to claim 1, wherein the sealing member is an O ring made of a resin.

6. The sintering apparatus according to claim 1, wherein the sealing member is made of any of silicone rubber, fluoride rubber, and polytetrafluoroethylene.

7. The sintering apparatus according to claim 1, wherein the furnace core tube has an outer surface to which a coating material absorbing light is applied as the heat radiation mechanism.

8. The sintering apparatus according to claim 1, wherein the outer surface of the furnace core tube is made opaque by roughening.

9. The sintering apparatus according to claim 1, wherein the flange is made of opaque quartz.

10. The sintering apparatus according to claim 1, wherein the upper lid is equipped with an O ring made of a resin.

11. The sintering apparatus according to claim 1, wherein the sealing member is made white and thereby the reflectance ratio of the sealing member to a heat ray is increased.

12. The sintering apparatus according to claim 1, wherein the sealing member is placed so as not to cross an upper extended surface of an inner wall of the furnace core tube.

* * * * *